UNITED STATES PATENT OFFICE.

HUBERT KOLF, OF BONN, GERMANY.

EXPLOSIVE AND PROCESS OF MAKING SAME.

SPECIFICATION forming part of Letters Patent No. 521,345, dated June 12, 1894.

Application filed August 11, 1890. Serial No. 361,712. (Specimens.)

*To all whom it may concern:*

Be it known that I, HUBERT KOLF, a subject of the Emperor of Germany, residing at Bonn, in the German Empire, have invented certain new and useful Improvements in Processes of Manufacturing Explosives; and I do hereby declare the following to be a full, clear, and exact description of the invention, such as will enable others skilled in the art to which it appertains to make and use the same.

The invention relates to the manufacture of a smokeless or substantially smokeless powder.

In carrying out my invention any suitable carbo-hydrate or combination of carbo-hydrates may be used, as for instance, malt grain, ground or comminuted malt, malt flour, refuse from the mash of distilleries and breweries, wood moss, carob, marsh mallow, the branches and refuse thereof, refuse resulting from the manufacture of starch, Iceland moss, and other similar carbo-hydrates. These, or one of these are or is treated with a mixture of nitric and sulfuric acids in the proportion of about one part nitric acid and two parts sulfuric acid at a temperature of from 20° to 30° centigrade, in a suitable vessel for about twelve hours in order to obtain a highly nitrated product, the proportion of carbo-hydrate material being such that the nitrated product will contain about 12.8 parts, or about thirteen per cent. of nitrogen. The nitrated mass is washed in cold water, the latter removed as much as possible either by filtering or centrifugal action, after which the material is dried at a temperature of from 40° to 50° centigrade, and ground or pulverized, which latter operation may, however, be performed while the material is still moist or damp. The nitrated and pulverized material is now treated with an aqueous solution of an alkaline sulfid, as for instance, potassium sulfid, preferably of a strength of about ten per cent., whereby the rate of combustion is regulated. As an example I may state that good results are obtained by treating one kilo of the nitrated pulverized and dried material with about one hundred grams of potassium sulfid ($K_2S$) under addition of about one thousand grams of water, but these proportions will vary according to the uses made of the explosive. This operation is effected in an iron vessel adapted to be closed fluid tight and provided with means for introducing air into the same, such air being compressed to about five atmospheres. After the material has remained under pressure for about two hours the air is allowed to escape and the material is then washed in water and thoroughly dried. In this operation a conversion of the nitro-carbo hydrate or nitro-cellulose into carbo-hydrate or ordinary cellulose cannot take place under the action of the potassium sulfid for the reason that said action is not prolonged enough when operating at a normal temperature, nor is the solution sufficiently concentrated to result in such conversion. On the contrary the nitrated product takes up under a chemical reaction a certain quantity of sulfur, at all events there is no mechanical mixture, which is evidenced by the fact that the sulfur cannot be removed by solvents, which would be the case if the admixture were simply a mechanical one. This is corroborated by analytical results of the product as shown by the following two examples, to-wit:

| Nitrogen. | Carbon. | Hydrogen. | Sulfur. |
|---|---|---|---|
| 12.23 | 26.49 | 3.18 | 2.48 |
| 13.53 | 26.80 | 3.07 | 2.56 | the percentage of nitrogen present clearly showing that a reduction of the nitro-carbo hydrate into a carbo hydrate does not take place. Now this addition or chemical combination of sulfur with the nitro cellulose regulates the combustion and also prevents the formation of those nitro products formed during the combustion of nitro cellulose free from sulfur. It would not be possible to express the product by a chemical formula for the reason that a specific nitro-carbo-hydrate is not present in the product, but mixtures of such nitro carbo-hydrates ranging from bi- to hexa-nitro combinations. The dried material is now combined or mixed with an aqueous solution containing from five to twenty per cent. of potassium nitrate or sodium or ammonium nitrate at ordinary temperatures, and preferably under a pressure of from four to five atmospheres. The mixture is allowed to stand about twelve hours, when the liquid is removed as much as possible by filtration or centrifugal action, and the mass is then dried at a temperature of about 80° centigrade.

The granulation of the dried product or its conversion into prisms or other compacted forms is effected by intimately mixing therewith a solution containing from two to twenty per cent. or more of a binitro derivative of one of the above named carbo-hydrates, and by afterward rolling, pressing, or otherwise compacting, and comminuting the compacted material in any desired manner, in which state it is ready for use.

The solutiion of the binitro derivative of a carbo-hydrate can be prepared by nitrating a carbo-hydrate in the usual manner, the nitro product being then treated with a solvent of dinitro cellulose, as for instance ethyl acetate, whereby a dinitro cellulose solution is obtained.

The described smokeless or substantially smokeless powder is homogeneous and stable, and consequently of uniform combustion.

It will be understood that I do not limit myself to the proportions above mentioned, for the reason that they may be varied within certain limits without departing from the nature of my invention.

Having thus described my invention, what I claim as new therein, and desire to secure by Letters Patent, is—

1. In the manufacture of explosives, the improvement which consists in nitrating a carbo-hydrate or a material containing the same, and then successively treating the nitrated carbo-hydrate with a solution of an alkaline sulfid and an alkaline nitrate.

2. In the manufacture of explosives, the improvement which consists in nitrating a carbo-hydrate or a material containing the same, and then successively treating the nitrated carbo-hydrate with solutions of an alkaline sulfid, an alkaline nitrate, and of a binitrate of a carbo-hydrate.

3. A substantially smokeless explosive, consisting of a nitrated carbo-hydrate, sulfur chemically combined therewith, and an alkaline nitrate, as described.

4. A smokeless explosive consisting of a nitrated carbo-hydrate, sulfur chemically combined therewith, an alkaline nitrate and a binitrate of a carbo-hydrate.

In testimony whereof I affix my signature in presence of two witnesses.

HUBERT KOLF.

Witnesses:
G. OELRICHS,
LOUIS OCHSE.